United States Patent [19]

Verton et al.

[11] Patent Number: 4,587,685
[45] Date of Patent: May 13, 1986

[54] WIPER ASSEMBLY FOR MOTOR VEHICLES

[75] Inventors: Jose Verton, Saint-Vincent; Norbert Guerard, Virton, both of Belgium

[73] Assignee: Champion Spark Plug Europe S.A., Binche, Belgium

[21] Appl. No.: 720,492

[22] Filed: Apr. 4, 1985

[30] Foreign Application Priority Data

Apr. 11, 1984 [FR] France .................................. 84 06700

[51] Int. Cl.⁴ .............................. B60S 1/32; B60S 1/04
[52] U.S. Cl. .................................. 15/250.42; 15/250.35
[58] Field of Search ........................ 15/250.35–250.42

[56] References Cited

U.S. PATENT DOCUMENTS 3,665,544  5/1972  Sakamoto ........................ 15/250.42

FOREIGN PATENT DOCUMENTS 1033521  4/1953  France .............................. 15/250.42
1060421  11/1953  France .............................. 15/250.42
1409802  7/1965  France .............................. 15/250.42

Primary Examiner—Peter Feldman
Attorney, Agent, or Firm—Wood, Dalton, Phillips, Mason & Rowe

[57] ABSTRACT

A wiper assembly for motor vehicles comprising a wiper arm having one portion secured to a mounting head opposite the portion on the drive shaft is provided with at least two spaced-apart hinges to which at least two rods are secured to connect said hinges to a flexor on a wiping element by means of claws. The at least two rods extend in opposite directions from their respective hinges towards the flexor or pressure distributing profile. The end portions of the at least two rods remote from the hinges carry leaf springs which have free ends resting on the flexor or pressure distributing profile to conform the wiping element to the surface to be wiped.

10 Claims, 12 Drawing Figures

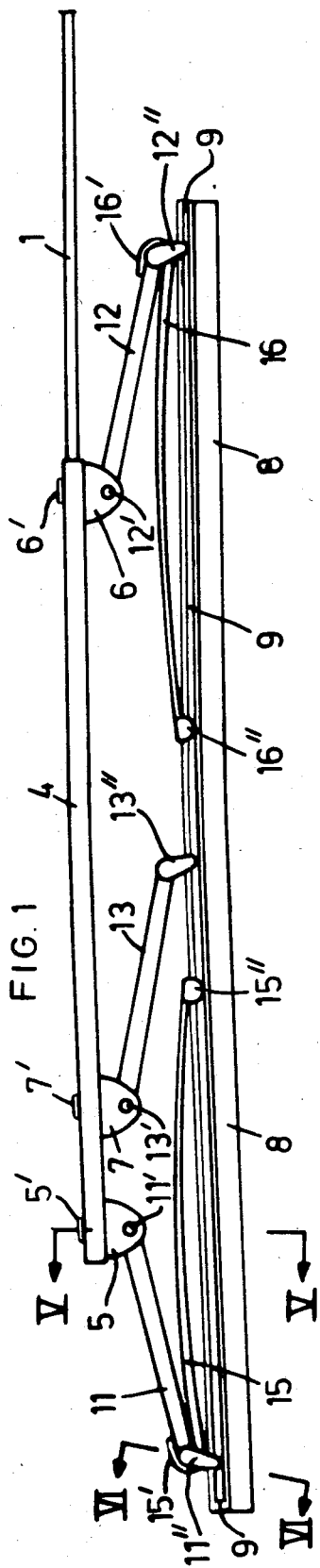
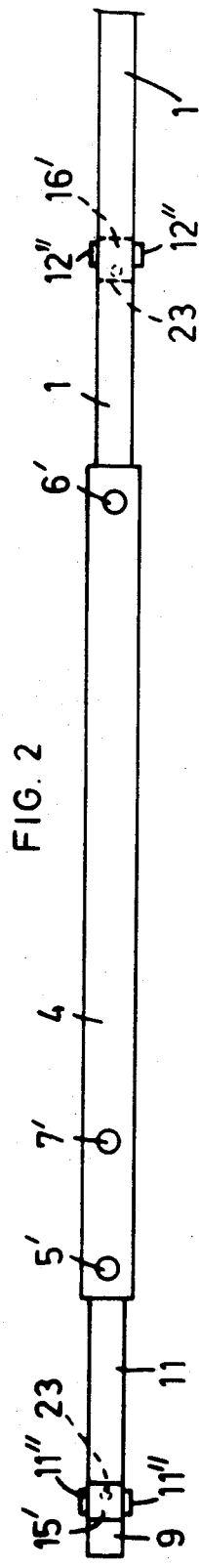
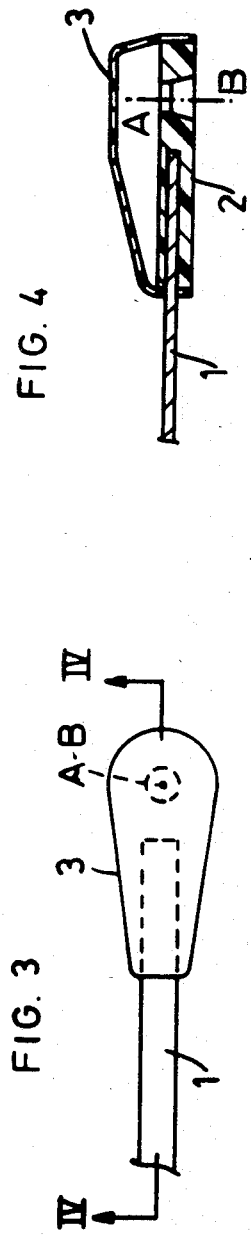

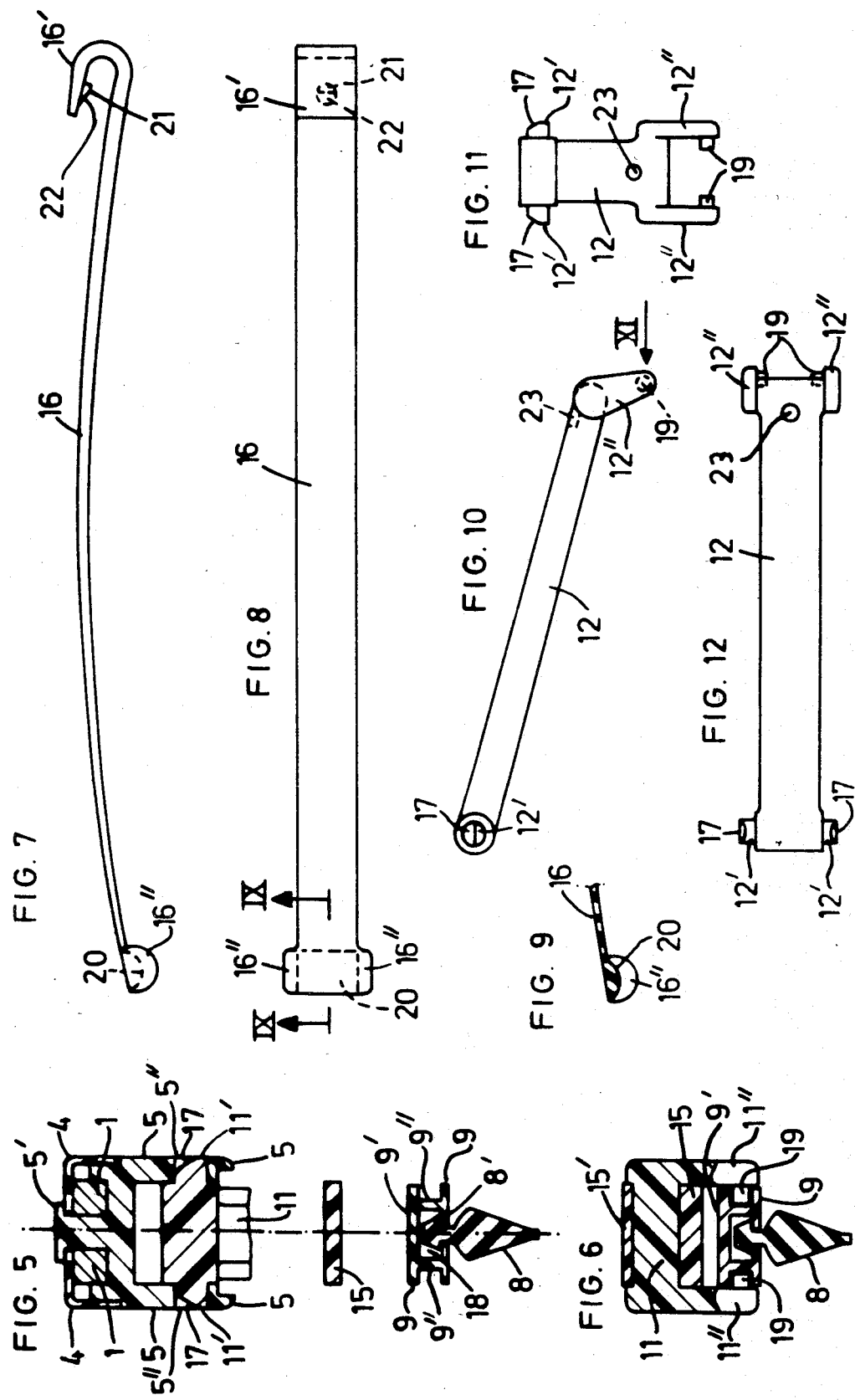

WIPER ASSEMBLY FOR MOTOR VEHICLES

DESCRIPTION

1. Background of the Invention

The present invention relates to a wiper assembly and, in particular, to a wiper assembly for motor vehicles wherein a wiper arm is provided with at least two spaced apart hinges and at least two rods which link said hinges to a wiping element.

2. Background Art

French Patent No. 1,409,802 shows a wiper assembly wherein rods extend on both sides of a rivet which functions as a hinge. Each rod is thus a two-limbed lever and one of the two limbs of the lever is submitted to the action of a spring (located inside the wiper arm), so that the other limb of the lever is pushed towards the pressure distributing profile and the wiping element. The main drawback of this system is its complexity, in particular as to the assembly of the rods to the wiper arm and as to the assembly of the springs inside the wiper arm.

The British Patent No. 318,270 shows another wiper assembly wherein the above mentioned rods are either rigid yokes linking the pressure distributing profile and consequently the wiping element to the wiper arm, or two-limbed bridges wherein the two limbs are linked together by a spring which pushes them towards the pressure distributing profile and the wiping element. The drawback of the rigid yokes is that they can be used only on relatively flat surfaces and the main drawback of the two-limbed bridges is, just as for the French Patent No. 1,409,802, the complexity of the assembly of a system wherein rivets are used as hinges and springs are to be placed inside of certain parts.

THE INVENTION

The object of the invention is to provide a wiper assembly, of the type described above, which comprises only easy to manufacture parts and of which the assembly of the different elements can easily be done by appropriate machines. The wiper assembly according to the invention will thus be an economic assembly and this more particularly also because all the components (except for the wiping element and possibly the wiper arm) can be made of appropriate plastic materials.

The wiper assembly according to the invention is substantially characterized by the fact that:

(a) said two rods extend in opposed directions from their respective hinges towards the pressure distributing profile, and (b) at their extremities opposed to their respective hinges said two rods are each provided with a leaf spring of which the free end rests on the pressure distributing profile.

The wiper assembly according to the invention is in particular also characterized by the fact that:

(a) The leaf springs are secured to the extremities of said rods by means of a snap-on system, and (b) said rods are secured to the corresponding hinges by means of a snap-on system.

Other characteristics of the invention will be better understood when reading the following portions of the specification in conjunction with the accompanying drawings.

BRIEF DESCRIPTION OF THE DRAWINGS

FIG. 1 is a side elevational view of the wiper assembly according to the invention;

FIG. 2 is a top view of the wiper assembly of FIG. 1;

FIG. 3 is a top view of the mounting head of the wiper assembly of FIGS. 1 and 2;

FIG. 4 is a section along line IV—IV of the mounting head of FIG. 3;

FIG. 5 is a section along line V—V of the wiper assembly of FIG. 1;

FIG. 6 is a section along line VI—VI of the wiper assembly of FIG. 1;

FIG. 7 is a side elevational view of one of the leaf springs of the wiper assembly of FIG. 1;

FIG. 8 is a top view of the leaf spring of FIG. 7;

FIG. 9 is a section along line IX—IX of the leaf spring of FIG. 8;

FIG. 10 is a side elevational view of one of the rods of the wiper assembly of FIG. 1;

FIG. 11 is a side view along arrow XI of the rod of FIG. 10; and

FIG. 12 is a top view of the rod of FIG. 10.

DETAILED DESCRIPTION OF A PREFERRED FORM OF THE INVENTION

FIGS. 1 through 4 show, in a general view, the wiper assembly according to the invention. The assembly substantially comprises: a wiper arm 1; two 5,6 or three 5,6,7 hinges; two 11,12 or three 11,12,13 rods provided with claws 11",12",13"; two leaf springs 15,16; a pressure distributing profile or backing strip 9 and a wiping element 8.

The wiper arm 1 is driven by the mounting head 2 (FIGS. 3,4) which in turn is driven by the drive shaft represented in the drawings by its geometrical axis A-B. A cap 3 covers the mounting head 2 and the drive shaft A-B. It is to be noted that the way the wiper arm 1 is secured to the mounting head 2, such as shown in FIGS. 3 and 4, is not part of the invention. Indeed any other system can be used, and in particular a conventional system comprising a hinge and a spring between the wiper arm and the mounting head.

The hinge 7 and the rod 13 with the claws 13" are optional, i.e. these elements are not indispensable for all practical applications of the wiper assembly according to the invention: they become less necessary if the wiping element is rather short. In the following description the wiper assembly according to the invention will therefore first be described in supposing that it comprises only the hinges 5,6 and the rods 11,12 and not the hinge 7 and the rod 13.

When the wiper assembly is working, the wiper arm 1 is pushed towards the surface to be wiped, i.e. towards the pressure distributing profile 9 and the wiping element 8. This load on the wiper arm is produced either by the fact that it is made of an elastic material and that it is pre-stressed towards the surface to be wiped or by the fact that it is substantially rigid and that a spring, attached to the mounting head, acts on it.

The load on the wiper arm 1 is transmitted to the pressure distributing profile 9 and consequently to the wiping element 8 by the rods 11,12 and the leaf springs 15,16. The wiper assembly according to the invention thus comprises four pressure points; i.e. the two claws 11",12" and the two free ends 15",16" of the two leaf springs 15,16.

It is to be noted that the hinges 5,6 are not provided with springs for pushing the rods 11,12 towards the pressure distributing profile 9. The leaf springs 15,16 comprise an upwardly bent portion 15',16' which allows them to be secured to the rods 11,12 by means of a snap-on system. The claws 11",12" are capable of sliding in lateral grooves provided in the pressure distributing profile 9 whilst the free ends 15",16" of the leaf springs 15,16 are capable of sliding on top of said pressure distributing profile 9.

FIG. 1 shows that:

(a) the rod 11 corresponding to the hinge 5 extends in the direction opposed to the drive shaft A-B;

(b) the rod 12 corresponding to the hinge 6 extends in the direction of the drive-shaft A-B;

(c) the leaf spring 15 corresponding to the rod 11 extends in the direction of the drive shaft A-B;

(d) the leaf spring 16 corresponding to the rod 12 extends in the direction opposed to the drive shaft A-B.

The structural details of the hinges 5,6 of the rods 11,12 of the leaf springs 15,16 of the pressure distributing profile 9 and of the wiping element 8 are shown at a larger scale in FIGS. 5 through 12. All these elements are made of an appropriate plastic material, except for the wiping element which is made of an elastomer.

In FIG. 5 it can be seen that the hinge which is located at the free end of the wiper arm 1 comprises a body 5 provided with a rivet 5' by means of which said body 5 is riveted to the wiper arm 1. The rivet 5' can be replaced by any other attachment means and in particular, by a snap-on deivce.

The lower portion of the body 5 has substantially the form of an inverted U and thus comprises two lateral walls extending downwards. Each of said two lateral walls is provided with a cylindrical opening 5" into which the cylindrical detents 11' provided on the upper portion of the rod 11 can snap. In order to facilitate the snapping of the detents 11' into the openings 5" of the body 5, said cylindrical detents 11' are provided with an inclined surface 17 at their upper portion. When assembling the properly so called hinge, the detents 11' are thus simply introduced from below into the cylindrical openings 5" of said body 5.

The element 4 which also has substantially the form of an inverted U and which is shown in FIGS. 1,2 and 5, has no particular technical function. From an aesthetic point of view it hides the joints between the wiper arm 1 and the hinges 5,6 in linking together said hinges.

FIG. 6 being a section of the claws 11", it can be seen that said claws comprise two detents 19 capable of sliding in the grooves 9"@(FIG. 5) of the pressure distributing profile 9 and that the head 8' of the wiping element 8 is located in the opening 18 (FIG. 5) which extends all along the pressure distributing profile 9. The claws 11", the pressure distributing profile 9 and the wiping element 8 may have various forms which are known in prior art.

The hinge 6 with its rivet 6' just as the rod 12 with its cylindrical detents 12' and its claws 12" (FIGS. 1, 2) have exactly the same form and dimensions as the corresponding above-described elements 5 and 11.

FIGS. 7 through 9 show the leaf spring 16 of FIG. 1, a leaf spring which is exactly the same as the leaf spring 15 of FIG. 1. The leaf spring 16 comprises at one of its extremities an upwardly bent portion 16' provided with a stop means 21 which, because of the inclined surface 22, allows it to snap into the opening 23 (FIGS. 10,11,12) of the rod 12. The leaf spring 16 is thus rigidly secured to the rod 12. At its other extremity the leaf spring 16 is provided with a supporting point formed by the curved surface 20 capable of sliding on the top surface 9' (FIGS. 5,6) of the pressure distributing profile 9 and with two lateral walls 16" which guide the sliding surface 20 along the pressure distributing profile 9. The two leaf springs 15,16 (FIG. 1) are prestressed from the respective claws 11",12" towards the pressure distributing profile 9 and thus transmit the load of the wiper arm 1 towards the central portion of said pressure distributing profile 9.

The rod 12 shown in FIGS. 10 through 12 is exactly the same as the rod 11 (FIG. 1) and all its characteristics have alrady been described above; i.e. the detents 12' provided with the inclined surfaces 17, the claws 12",19 and the opening 23 which receives the stop 21,22 of the leaf spring 16.

In the same way, the hinge 7 (7') and the rod 13 (13',13") are identical with the corresponding parts 5,6 and 11,12 (FIG. 1). The hinge 7 and the rod 13 do not transmit the load of the wiper arm towards the pressure distributing profile 9. Their only function is to reinforce the whole assembly of the wiper blade, in particular in the case when the pressure distributing profile 9 and consequently the wiping element 8 have a certain length.

One embodiment of a new invention has thus been described, but it is evident that the invention is not limited to this embodiment. Indeed modifications may be made without departing from the scope of the invention such as defined in the appended claims.

We claim:

1. A wiper assembly, in particular for motor vehicles, comprising a wiper arm of which one of the extremities is secured to a mounting head driven by a drive shaft and of which the portion opposed to the drive shaft is provided with two spaced apart hinges, and also comprising two rods which link said hinges to a wiping element by claws and by a pressure distributing profile, characterized in that:

(a) said two rods extend in opposed directions from their respective hinges towards the pressure distributing profile, and (b) at their extremities opposed to their respective hinges said two rods are each provided with a leaf spring of which the free end rests on the pressure distributing profile.

2. A wiper assembly according to claim 1, characterized in that:

(a) the rod corresponding to the hinge which is farthest away from the drive shaft extends in the direction opposed to said drive shaft, and (b) the rod corresponding to the hinge which is closest to the drive shaft extends in the direction of said drive shaft.

3. A wiper assembly according to claim 2, characterized in that:

(a) the leaf spring corresponding to the rod which is farthest away from the drive shaft extends in the direction of said drive shaft, and (b) the leaf spring corresponding to the rod which is closest to the drive shaft extends in the direction opposed to said drive shaft.

4. A wiper assembly according to claim 1 wherein the wiper arm comprises a third hinge characterized in that the third hinge is located between said two hinges.

5. A wiper assembly according to claim 4, characterized in that the third hinge is linked to the pressure distributing profile via a third rod provided with claws at its extremity which is opposed to said third hinge.

6. A wiper assembly according to claim 1, characterized in that the claws of said rods are capable of sliding in lateral grooves provided in the pressure distributing profile.

7. A wiper assembly according to claim 1, characterized in that the leaf springs are secured to the extremities of said rods by means of a snap-on system.

8. A wiper assembly according to claim 1, characterized in that said rods are secured to the corresponding hinges by means of a snap-on system.

9. A wiper assembly according to claim 1, characterized in that the hinges, the rods, the leaf springs and the pressure distributing profile are made of appropriate plastic materials.

10. A wiper assembly according to claim 1, characterized in that the wiper arm is made of an elastic material.

* * * * *

UNITED STATES PATENT AND TRADEMARK OFFICE
CERTIFICATE OF CORRECTION

PATENT NO. : 4,587,685
DATED : May 13, 1986
INVENTOR(S) : Jose Verton and Norbert Guerard It is certified that error appears in the above-identified patent and that said Letters Patent is hereby corrected as shown below:

In the Abstract:

Line 3, after the word "head" please add --and driven by a drive shaft. Another portion of the arm --

In Background Art:

Second paragraph, line 1, after the word "No." please add 1, so now the Patent No. will read --1,318,270--

Signed and Sealed this

Twelfth Day of August 1986

[SEAL]

Attest:

DONALD J. QUIGG

Attesting Officer

Commissioner of Patents and Trademarks